Nov. 29, 1938.  C. D. BUCK  2,138,534
AUTOMATICALLY OPERATED GEAR SHIFTING MECHANISM
Filed Aug. 31, 1936  3 Sheets-Sheet 1

Clyde D. Buck  INVENTOR.
BY
H. G. Burns  ATTORNEY.

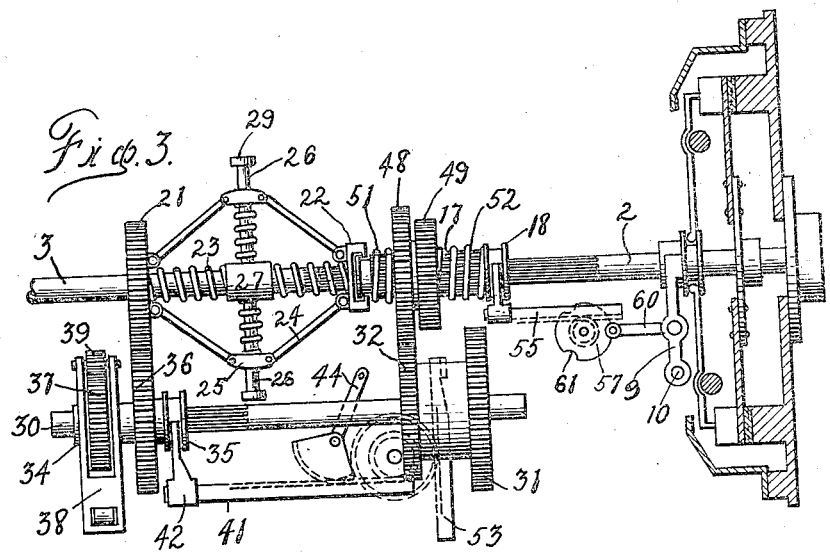
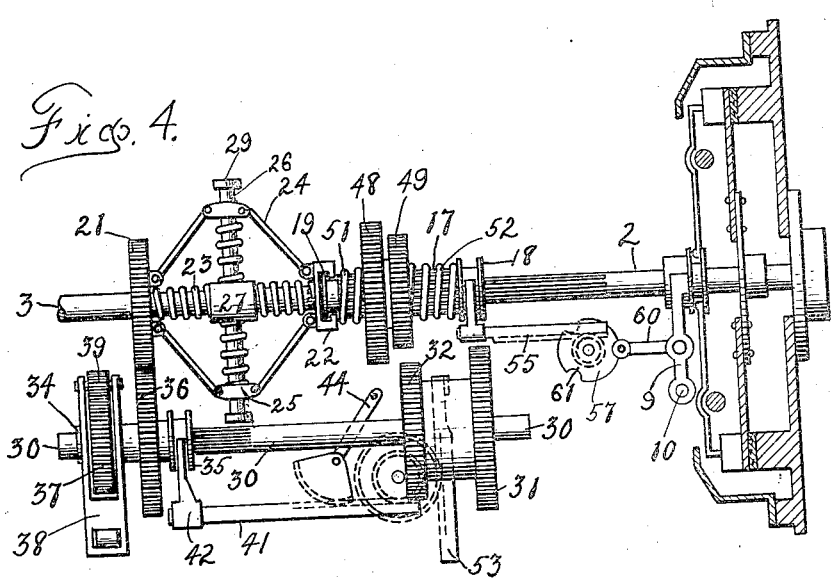

Nov. 29, 1938.  C. D. BUCK  2,138,534
AUTOMATICALLY OPERATED GEAR SHIFTING MECHANISM
Filed Aug. 31, 1936  3 Sheets-Sheet 3
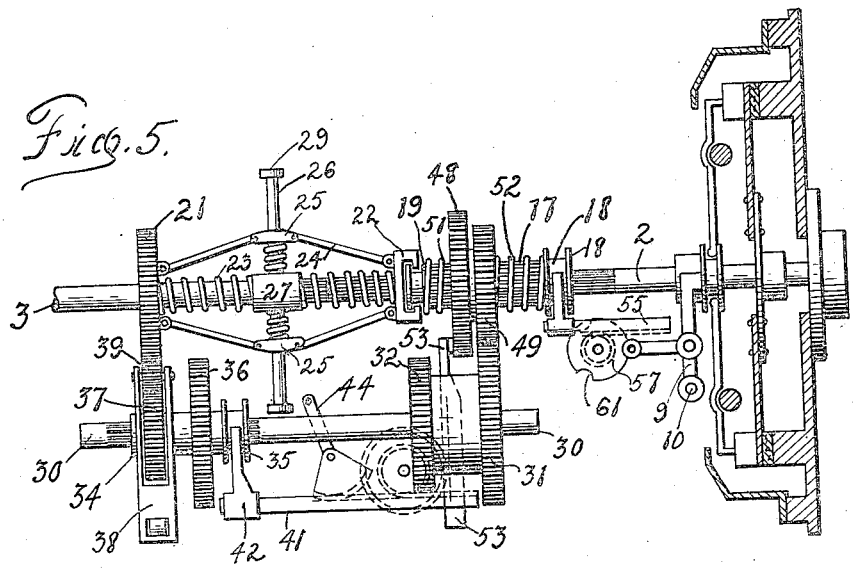
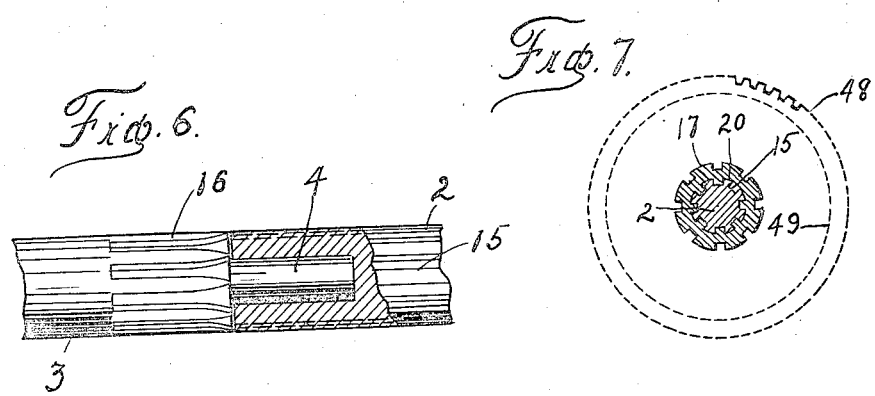
Clyde D. Buck  INVENTOR.
BY
H. G. Burns  ATTORNEY.

Patented Nov. 29, 1938

2,138,534

UNITED STATES PATENT OFFICE 2,138,534

AUTOMATICALLY OPERATED GEAR SHIFTING MECHANISM

Clyde D. Buck, Fremont, Ind.

Application August 31, 1936, Serial No. 98,713

8 Claims. (Cl. 192—3.5)

This invention relates to improvements in automatically operated gear shifting mechanism and is designed for use in the transmission of mechanical movement from the engine and drive wheels of an automobile at different ratios of speed selectively by mechanism automatically operated according to the traveling speed of the automobile.

An object of the invention is to provide an automatically operating governor for shifting the gears of a power transmission mechanism from its low speed adjustment into intermediate position and from thence into direct or high speed adjustment, accordingly as the velocity of the automobile is increased.

Another object of the invention is to provide, in a transmission mechanism, automatic means for shifting the gears from one speed adjustment to another according to the speed of the vehicle while traveling forward, and mechanism to prevent operation of said automatic means when the gearing is moved into its adjustment for reverse movement as when backing the automobile.

An illustrative embodiment of the invention is shown in the accompanying drawings, in which:—

Fig. 3 is a diagram of the mechanism shown in Figs. 1 and 2 with the gearing arranged in their second speed adjustment;

Fig. 4 is a similar diagram showing the gears arranged in their adjustment for high speed;

Fig. 5 is another diagram showing the gears arranged in their adjustment for reversing the driving movement;

Fig. 6 is a detail fragmentary view, partly in section showing the connection between the engine shaft and propeller shaft; and Fig. 7 is a detail view showing a cross-section of the engine shaft and a gear-carrying sleeve thereon.

Figure 1:
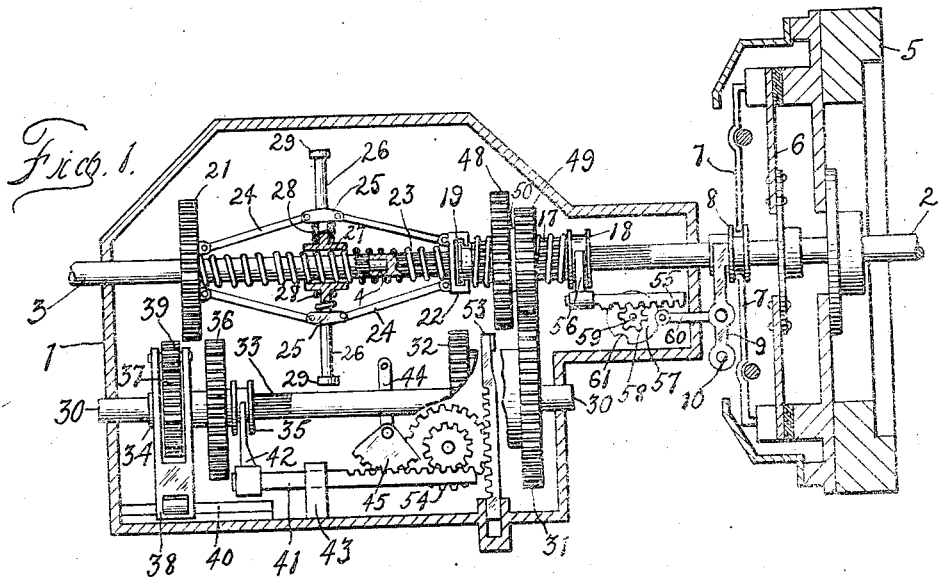
Fig. 1 is an elevation of a mechanism embodying the invention and including a transmission gearing for an automobile and driving means therefore, portions being in section and the gears adjusted to neutral position.

The illustrative embodiment of the invention consists of a housing 1 having mounted therein a drive shaft 2 and a propeller shaft 3 arranged in axial alinement with each other, the abutting ends of said shafts being sustained in alinement by means of a pintle 4 that extends from the end of the propeller shaft 3 and projects loosely into the adjacent end of the drive shaft 2, thus permitting relative rotary movement of said shafts.

Upon the drive shaft 2 is mounted an engine fly-wheel 5 and a clutch mechanism 6 associated therewith that is controlled by levers 7 operated by a sliding grooved sleeve 8 on the drive shaft 2 as in the usual practice.

A lever 9 mounted upon a stationary pivot 10 has operative connection with the grooved sleeve 8 and is provided with an extension 11 that is operatively associated with a foot pedal 12 through the medium of a pivoted lever 13 and connecting rod 14 so that when said pedal is depressed the clutch mechanism is thrown out of action.

Those portions of the drive and propeller shafts adjacent their abutting ends have made therein an annular series of external splines 15 and 16 respectively that extend parallel with the axes of said shafts. The splines 16 in the propeller shaft are made divergent at the ends of the shaft for the purpose hereinafter described. Upon the drive shaft is mounted a longitudinally movable sleeve 17 provided at each end thereof with a grooved annular collar 18—19, said sleeve having an annular series of internal longitudinal splines 20 that engage in the corresponding splines 15 in the drive shaft and when the sleeve is shifted to such position as to bridge the abutting ends of said shafts, engage also in the splines 16 in the propeller shaft, thus locking said shafts against relative rotation. The splines 16 being divergent at their outer ends permit ready entrance of the splines 20 into said splines 16 during adjustment of the sleeve into engaging relation with the propeller shaft.

An annular gear 21 is fixed rigidly upon the propeller shaft 3, and a yoke 22 is mounted to have sliding movement axially upon the drive and propeller shafts and has actuating relation with the collar 19 on the sleeve 17. A compression spring 23 is interposed on the shafts 2 and 3 between the gear and yoke 22 and said gear and yoke are connected by a series of pivoted governor arms 24 disposed in pairs that are connected by corresponding weights 25, the arms, weights and yoke constituting a governor. The weights have guided movement respectively upon a series of radially disposed guide rods 26 that extend in common from a ring 27 which loosely encompasses the compression spring 23. Upon each guide rod between said ring and the corresponding weight is disposed a cushion spring 28. As the propeller shaft is rotated the governor is revolved and the weights thereupon move radially outward to a more or less extent according to the velocity of the propeller shaft, whereupon, the sleeve 17 is drawn by the action of the governor axially on the drive shaft toward the gear 21 in opposition to the pressure of the spring 23. The outer end of each guide rod 26 is provided with a head 29 by which is limited outward movement of the corresponding governor weights 25 and axial movement of the sleeve 17 in one direction.

A countershaft 30 is rotatively mounted in the housing the axis of which extends parallel to that of the shafts 2 and 3 and suitably spaced therefrom. The countershaft 30 has keyed thereon a pair of step gears 31 and 32 disposed within the housing and adjacent to the forward end of the shaft. The opposite end of the countershaft has formed therein an annular series of splines 33 and has mounted thereon a sliding sleeve 34 that has engagement with said splines so that said sleeve is axially movable upon the countershaft and angularly immovable relative thereto. One end of the sleeve 34 has thereon an annular grooved collar 35 and upon said sleeve are keyed a pair of gears 36 and 37. A carrier frame 38 is loosely mounted upon the sleeve 34, and has pivoted in one end thereof a pinion 39, and the other end of said frame has sliding engagement with a guide rail 40 that is secured in said housing and extends parallel to the axis of said shaft. The gear 36 and pinion 39 have engagement with the propeller shaft gear 21 selectively as the sleeve 34 is adjustably positioned accordingly on the countershaft 30.

A shifter constituted of a rack-bar 41 and an arm 42 secured on one end of said rack-bar is provided for adjustably moving the sleeve 34 on the countershaft. The rack-bar has sliding movement in a stationary support 43 and the arm 42 has operative engagement with the collar 35 so that by longitudinal adjustments of the rack-bar the sleeve 34 is accordingly moved and either the gear 36 or the pinion 39 is brought into engagement with the propeller-shaft gear 21. A pivoted gear shift lever 44 having a toothed segment 45 has operative engagement with the rack-bar 41 by which the shifter is manually adjusted. Preferably, the lever 44 is operatively connected by means of a rod 46 with a hand-operated lever 47 located within convenient reach of the operator while seated in the automobile (not shown).

Figure 2:
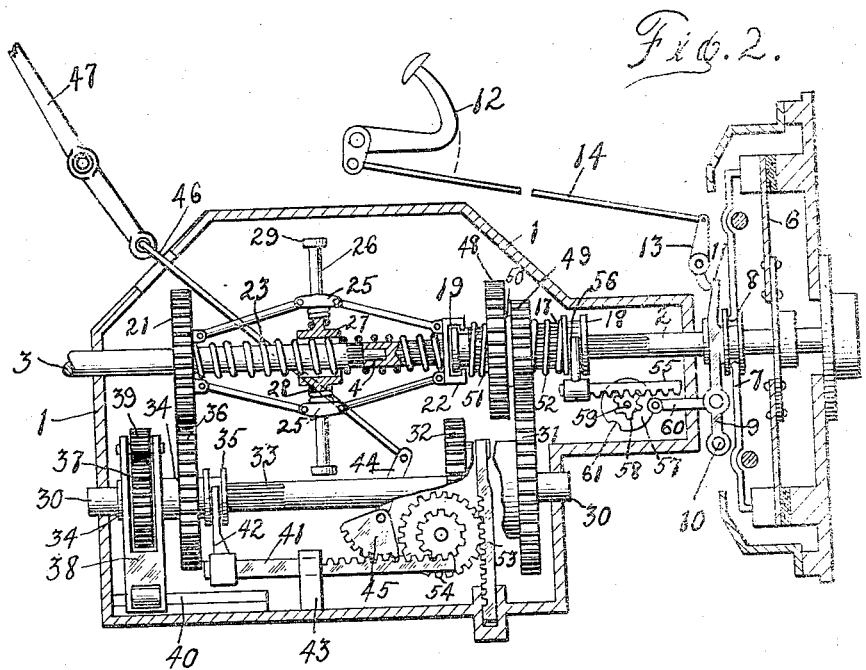
Fig. 2 is a similar view with the gears shown adjusted to low speed position.

A pair of step-gears 48 and 49 having a common hub 50 are mounted upon the sleeve 17 and have splined relation with said sleeve, and compression springs 51 and 52 are disposed upon the sleeve 17 between said step-gears and the corresponding grooved collars 19 and 18 whereby the gears are yieldingly held in normal position upon said sleeve while permitting slight longitudinal movement of said gears relative to said sleeve. Accordingly as the sleeve 17 is adjustably positioned the gear 48 engages with the gear 32 or the gear 49 has engagement with the gear 31. When the gear 49 engages with the gear 31 the gear 48 is out of mesh with the gear 32, as in Figs. 1, 2 and 5, and when the gear 48 has engagement with the gear 32, the gear 49 then is out of mesh with the gear 31 as in Fig. 3. When, however, the sleeve 17 is moved into splined engagement with the propeller shaft 3 (Fig. 4) both gears 48 and 49 are then out of engagement with their respective cooperative gears 30 and 31. The gear ratios between the driving gears 48 and 49 and their respective cooperative gears 30 and 31 differ from each other and consequently the speed of the countershaft 30 relative to that of the drive shaft 2 is variable dependent upon which of the driving gears is in mesh, and the speed of the propeller shaft 3 is accordingly variable (Figs. 1, 2 and 3). When the sleeve 34 is moved to neutral position, shown in Fig. 1, the propeller-shaft gear 21 is then out of mesh and the countershaft idles as the drive shaft rotates while the propeller shaft is inert. When the sleeve 34 is shifted to reverse position, as shown in Fig. 5, the propeller-shaft gear 21 and the countershaft gear 37 are in mesh with the pinion 39 so that the propeller shaft then is rotated reversely with respect to the drive shaft.

During operation of the gearing while in reverse it is desirable to prevent movement of the sleeve 17 out of low gear position (Fig. 2) and thus insure against excessive reverse speed of the propeller shaft. To this end there is an adjustable stop 53 mounted to have sliding movement and adapted to be projected into the position shown in Fig. 5 thereby to prevent axial movement of the gears 48 and 49 out of low gear position. Gears 54 mounted in the housing have toothed engagement respectively with said stop and the shifter 41 so that upon movement of the sleeve 31 into reverse position (Fig. 5), by adjustment of the shifter, the stop 53 is automatically moved into operative position and is also automatically moved out of operative position as the sleeve 34 is moved out of reverse position.

A second shifter constituted of a rack-bar 55 and an arm 56 secured on one end thereof is arranged to be actuated by the sleeve 17, the arm 56 having engagement with the collar 18 on the sleeve. A notched disc 57 and a pinion 58 are secured on a shaft 59. The pinion has operative engagement with the rack-bar 55 and the disc has operative engagement with the clutch control lever 9 through the medium of a push-member 60. The inner end of the push member bears against the perimeter of the notched disc 57 and when received in any one of the notches 61 in the disc the clutch lever 9 is relieved of pressure from the push member, and when the disc is turned so that said member bears against its perimeter at points between said notches pressure is exerted against the lever 9 causing the clutch to be thrown out of action. By this arrangement the shifting of the gears 48 and 49 from one position to another takes place only while the clutch is automatically held out of action. As the step-gears 48 and 49 are shifted into mesh with their cooperative gears 30 and 31 raking of the teeth of the engaging gears is substantially obviated because of the longitudinal play of the step-gears on their sleeve, permitted by yielding of the compression springs 51 and 52 when the teeth of one gear obstruct those of the gear that is being moved into meshing engagement therewith.

Operation

In operation, when the mechanism is in neutral position (Fig. 1) the drive shaft 2 rotates without imparting movement to the propeller shaft and its associated governor. The mechanism is thrown from neutral position into low gear by manually depressing the clutch pedal thereby throwing the clutch out of action and concurrently manipulating the gear shift lever 47 to thereby move the countershaft gear 36 into mesh with the propeller-shaft gear 21. Then, upon releasing the clutch pedal the clutch is thereby thrown into action causing rotation of the propeller shaft and the governor. As the speed of the propeller shaft and governor increases the weights 25 of the governor are moved outwardly by centrifugal force causing the sleeve 17 to be drawn from low gear position (Fig. 2) into intermediate position (Fig. 3), and upon further increase in the speed of the propeller shaft and governor the sleeve 17 is drawn by action of the governor from intermediate gear (Fig. 3) into high gear (Fig. 4). When the mechanism is in high gear, the step gears 48 and 49 are out of mesh and the sleeve 17 is in splined connection with the drive and propeller shafts. Thus, the drive and propeller shafts rotate at the same velocity while the countershaft 30 is rotated idly through the medium of the gears 21 and 36.

As in customary practice, the propeller shaft has geared connection with the drive wheels of an automobile (not shown) and is revolved at a definite speed ratio related to the travel of the automobile. As the velocity of the automobile is slackened, the speed of the propeller shaft and governor is proportionately reduced, whereupon the governor weights 25 move inwardly and the sleeve 17 under pressure of the spring 23 is moved from high gear (Fig. 4) into intermediate gear (Fig. 3), and, as the speed of the governor is further reduced the sleeve is moved into the low gear position (Fig. 2). Thus, it will appear that the mechanism is shifted from neutral position (Fig. 1) into low gear (Fig. 2) and from neutral position into reverse (Fig. 5) by manipulation upon the part of the operator, while the shifting of the mechanism from low gear into intermediate gear and high gear, and vice versa, is selective and attained automatically through action of the governor dependent upon the traveling speed of the automobile.

What I claim is:—

1. In a transmission mechanism, a housing, a drive shaft extending into the housing, a clutch mechanism and operating lever therefor associated with an engine, a propeller shaft extending into said housing alined with and abutting said drive shaft, the abutting end portions of said shafts having splines made therein, a sleeve on said drive shaft engaged with the splines therein and being movable axially into engagement with the splines in said propeller shaft, said sleeve having a grooved collar at each end thereof and external splines, a pair of step gears on said sleeve having splined relation therewith, compression springs on said sleeve disposed respectively between said collars and the corresponding ends of said sleeve, a gear secured on said propeller shaft, another compression spring disposed upon the drive and propeller shafts between said sleeve and the propeller shaft gear, a centrifugal governor having weights and arranged to rotate with the propeller shaft and having connection with said sleeve to effect axial movement thereof, a guide member having radial rods that project loosely through said weights provided with springs to cushion inward movement of said weights, a rotatively mounted disc having a series of notches in its periphery, a push member, one end of which bears against the periphery of said disc and the other end thereof has engagement with said operating lever for said clutch mechanism, a shifter mechanism operatively connecting said sleeve and disc, a countershaft mounted in said housing provided at one end with step gears cooperative with the step gears on said sleeve selectively engageable therewith, a second sleeve splined on the opposite end of said countershaft, gears secured on said second sleeve, a frame on said second sleeve provided with a pinion meshed with one of the latter gears, the other of said latter gears and said pinion being adapted to mesh with the propeller-shaft gear selectively by adjustment of said second sleeve, a manually-operated shifter for said second sleeve, and a stop mechanism automatically actuated by the manually-operated shifter arranged to prevent movement of said step gears out of low gear position when said second sleeve is moved into reverse gear position.

2. In a transmission mechanism, a housing, a drive shaft extending into the housing, a clutch mechanism and operating lever therefor associated with an engine, a propeller shaft extending into said housing alined with and abutting said drive shaft, a sleeve on said drive shaft having splined relation therewith and being movable to have also splined relation with said propeller shaft, said sleeve having at each end thereof a collar, a pair of step gears on said sleeve having splined relation therewith, compression springs on said sleeve disposed respectively between said collars and the corresponding ends of said sleeve, a gear secured on said propeller shaft, another compression spring disposed between said gear and said sleeve, a centrifugal governor arranged to rotate with the propeller shaft and having connection with said sleeve to effect axial movement thereof, a rotatively mounted disc having a series of notches in its periphery, a push member, one end of which bears against the periphery of said disc and the other end thereof has engagement with said operating lever for said clutch mechanism, a shifter mechanism operatively connecting said sleeve and disc, a countershaft mounted in said housing provided at one end thereof with step gears cooperative with the step gears on said sleeve selectively engageable therewith, a second sleeve splined on the opposite end of said countershaft, gears secured on said second sleeve, a frame on said second sleeve provided with a pinion meshed with one of the latter gears, the other of said latter gears and said pinion being adapted to mesh with the propeller-shaft gear selectively by adjustment of said second sleeve, a manually-operated shifter for said second sleeve, and a stop mechanism automatically actuated by the manually-operated shifter arranged to prevent movement of said step gears out of low gear position when said second sleeve is moved into reverse gear position.

3. In a transmission mechanism, a mounted drive shaft provided with a clutch, including an operating lever for said clutch, associated with an engine, a propeller shaft mounted in alinement with and axially abutting said drive shaft, the abutting ends of said shafts having splines made therein, a sleeve on said drive shaft engaging the splines therein and being movable to have engagement also with the splines in said propeller shaft, a pair of step gears on said sleeve having splined relation therewith, compression springs on the sleeve for holding said step gears yieldingly in a normal position, a gear secured on said propeller shaft, another compression spring disposed between said gear and said sleeve, a centrifugal governor rotatable with said propeller shaft adapted to impart axial movement to said sleeve, a rotatively mounted disc having a series of notches in its periphery, a push member, one end of which bears against the periphery of said disc and the other end thereof has engagement with said operating lever of said clutch, a shifter mechanism operatively associated with said sleeve and disc for concurrent movement thereof, a mounted countershaft provided at one end thereof with step gears cooperative with the step gears on said sleeve selectively engageable therewith, a second sleeve splined on the opposite end of said countershaft, gears secured on said second sleeve, a frame on said sleeve provided with a pinion meshed with one of the latter gears, the other of said latter gears and said pinion being adapted to mesh with the propeller shaft selectively by adjustment of said second sleeve, a manually-operated shifter for said second sleeve, and a stop mechanism automatically actuated by the manually-operated shifter arranged to prevent movement of said step gears out of low gear position when said second sleeve is moved into reverse gear position.

4. In a transmission mechanism, a drive shaft having thereon a clutch mechanism associated with an engine, said clutch mechanism including an operating lever therefor, a propeller shaft having a gear secured thereon and axially alined with and abutting said drive shaft, the abutting end portions of said shafts having splines, a sleeve on said drive shaft normally engaging the splines therein adapted to be moved in engagement with the splines in said propeller shaft and thereby lock said shafts against relative rotation, step gears splined on said sleeve, a countershaft having step gears cooperative selectively with the step gears on the drive shaft accordingly as said sleeve is adjustably positioned, a governor mechanism rotatable with the propeller shaft and operatively connected with said sleeve adapted to automatically move said sleeve axially more or less according to the rotative speed of the propeller shaft and thereby move the step gears on said sleeve into and out of mesh with their respective cooperative gears on said countershaft, gear mechanism on said countershaft adapted for engagement with the gear on said propeller shaft adapted for transmission of direct or reverse motion selectively accordingly as adjusted on said countershaft, manually-operated means for adjusting said gear mechanism, a movable stop having mechanical connection with said manually-operated means including a connection with said manually-operated means for automatically adjusting said stop, and a mechanism operatively associated with the sleeve on the drive shaft and the operating lever for the clutch for automatically throwing the clutch out of action during movement of the step gears on said sleeve into and out of meshing engagement with their respective cooperative gears.

5. In mechanism of the class described, a speed change gear mechanism including a drive shaft provided with a clutch mechanism associated with an engine, said clutch mechanism having an operating lever, a propeller shaft abutting the drive shaft, the abutting ends of said shafts having splines, a sleeve on said drive shaft engaged with the splines therein adapted to have engagement also when adjusted with the splines in said propeller shaft, a governor actuated by rotation of said propeller shaft having operative connection with said sleeve, step gears splined on said sleeve, a gear secured on said propeller shaft, a countershaft having gears thereon cooperative with and selectively engageable respectively by said step gears, said countershaft having also adjustably mounted thereon gear mechanism for direct and reverse movement selectively engageable with said propeller shaft gear, a manually-operated shifter for said gear mechanism, a stop mechanism automatically actuated by the manually-operated shifter arranged to prevent movement of said step gears out of low gear position when said gear mechanism is moved into reverse position, and a shifter mechanism operatively connected with said sleeve and clutch operating lever for throwing the clutch out of action with said step gears when moved into and out of engagement with their cooperative gears.

6. In mechanism of the class described, a speed change gear mechanism including a drive shaft, a propeller shaft abutting the drive shaft, the abutting ends of said shafts having splines, a sleeve on said drive shaft engaged with the splines therein adapted to have engagement also when adjusted with the splines in said propeller shaft, a governor actuated by rotation of said propeller shaft having operative connection with said sleeve for automatic movement of said sleeve, step gears splined on said sleeve, a gear secured on said propeller shaft, a countershaft having gears thereon cooperative with and selectively engageable respectively by said step gears, said countershaft having also adjustably mounted thereon gear mechanism for direct and reverse movement selectively engageable with said propeller shaft gear, a manually-operated shifter for said gear mechanism, and a stop mechanism automatically actuated by the manually operated shifter arranged to prevent automatic shifting of said step gears by action of said governor when said gear mechanism is moved into reverse position.

7. In speed change gear mechanism, alined driving and propeller shafts the abutting ends of which have splines, a sleeve movable to have splined relation selectively with one or both of said shafts, a centrifugal governor on said propeller shaft operatively connected with said sleeve, step gears splined on said sleeve engageable with corresponding cooperative gears secured on a countershaft, a second sleeve splined on said countershaft having a shifter therefor provided with a manually operated lever, a gear on said propeller shaft, gearing on the last mentioned sleeve engageable selectively with the propeller shaft gear adapted for imparting movement thereto in one direction or reverse accordingly as said last mentioned sleeve is adjusted, and a movable stop operatively connected with said shifter adapted to prevent automatic adjustment of said step gears when said gearing is moved to reverse position.

8. In a speed change gear mechanism having neutral, low, intermediate, high and reverse shift gear positions, a motor-driven clutch operatively connected with said mechanism, a governor incorporated in said mechanism arranged to automatically shift the intermediate and high gears into and out of action, a shifter mechanism arranged in connection with said clutch and governor so constructed as to automatically throw said clutch out of action during shifting periods of said intermediate and high gears, and manually-operated means for shifting the low and reverse gears into and out of action, said manually operated means including mechanism actuated thereby to shift the speed change gear mechanism into reverse gear and coincidentally intercept engagement of the intermediate and high gears during engagement of the reverse gearing.

CLYDE D. BUCK.